United States Patent
Park

(10) Patent No.: US 10,346,954 B2
(45) Date of Patent: Jul. 9, 2019

(54) IMAGE PHOTOGRAPHING APPARATUS FOR PROVIDING OUT-OF-FOCUS EFFECT AND METHOD OF CONTROLLING THEREOF

(71) Applicant: SAMSUNG ELECTRONICS CO., LTD., Suwon-si, Gyeonggi-do (KR)

(72) Inventor: Kyong-tae Park, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/283,650

(22) Filed: Oct. 3, 2016

(65) Prior Publication Data
US 2017/0148142 A1 May 25, 2017

(30) Foreign Application Priority Data
Nov. 24, 2015 (KR) .................. 10-2015-0165012

(51) Int. Cl.
| | |
|---|---|
| G06T 5/00 | (2006.01) |
| H04N 5/235 | (2006.01) |
| H04N 5/232 | (2006.01) |
| H04N 13/204 | (2018.01) |
| G06T 5/50 | (2006.01) |

(52) U.S. Cl.
CPC .......... *G06T 5/002* (2013.01); *G06T 5/50* (2013.01); *H04N 5/2351* (2013.01); *H04N 5/2353* (2013.01); *H04N 5/23216* (2013.01); *H04N 5/23229* (2013.01); *H04N 5/23293* (2013.01); *H04N 13/204* (2018.05); *G06T 2207/10016* (2013.01); *G06T 2207/30196* (2013.01)

(58) Field of Classification Search
CPC ............ H04N 17/002; H04N 5/23212; H04N 5/2254; G02B 7/28
USPC ....................................... 348/222.1
See application file for complete search history.

(56) References Cited

U.S. PATENT DOCUMENTS

| | | | |
|---|---|---|---|
| 5,930,383 A | 7/1999 | Netzer | |
| 8,780,258 B2 | 7/2014 | Lee | |
| 2009/0160963 A1 | 6/2009 | Kim | |
| 2010/0283589 A1* | 11/2010 | Kawai | B60Q 9/005 340/425.5 |
| 2013/0027587 A1* | 1/2013 | Matsui | H04N 5/2226 348/241 |
| 2014/0218557 A1* | 8/2014 | Ebe | H04N 5/2351 348/222.1 |
| 2015/0116542 A1 | 4/2015 | Lee | |

(Continued)

FOREIGN PATENT DOCUMENTS

| | | |
|---|---|---|
| JP | 5420050 | 2/2014 |
| KR | 10-1510098 | 4/2015 |
| KR | 10-2015-0049122 | 5/2015 |

*Primary Examiner* — Lin Ye
*Assistant Examiner* — Chan T Nguyen
(74) *Attorney, Agent, or Firm* — Nixon & Vanderhye, P.C.

(57) ABSTRACT

An image photographing apparatus is provided, which includes a camera which photographs an image, a processor which is configured to control the camera to acquire a plurality of first images based on a first shutter timing and to acquire a second image based on a second shutter timing, wherein the processor is further configured to generate a brightness map of the second image using the acquired first images, and to generate a post-processed image of the second image using the generated brightness map.

20 Claims, 15 Drawing Sheets

(56) References Cited

U.S. PATENT DOCUMENTS

2016/0191820 A1\* 6/2016 Iwasaki ............. H04N 5/23232
 348/169

\* cited by examiner

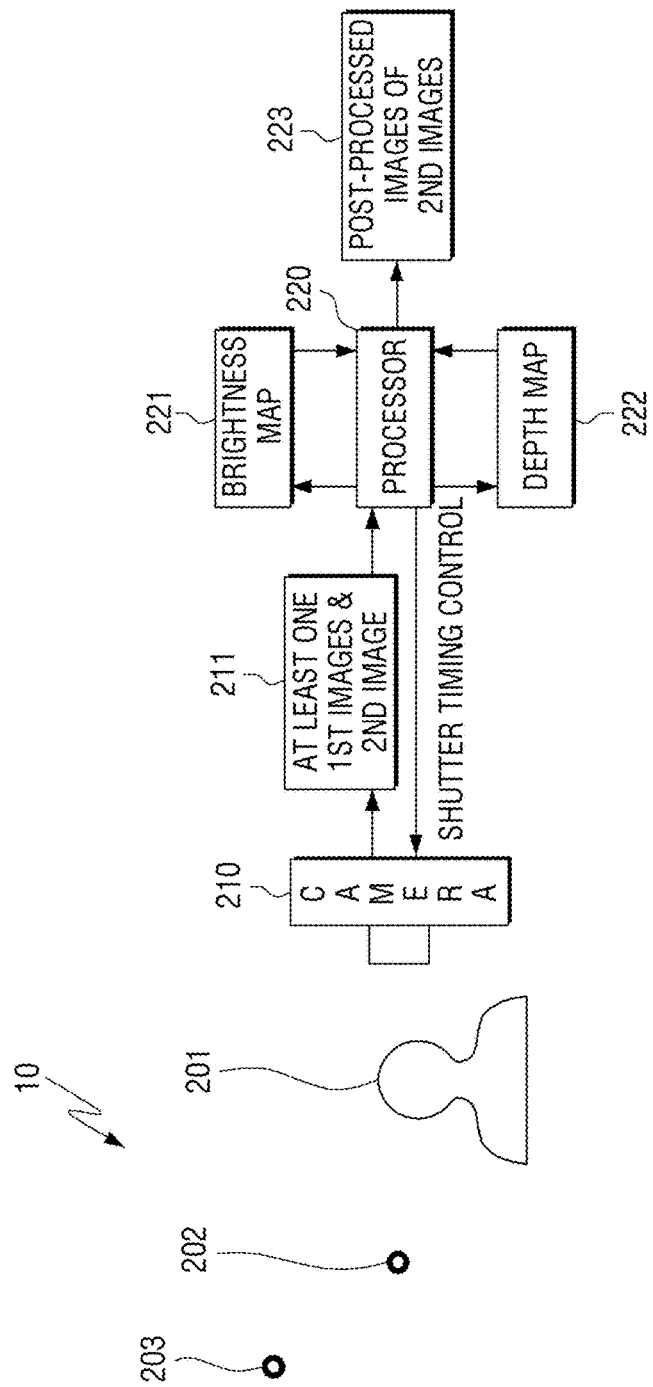

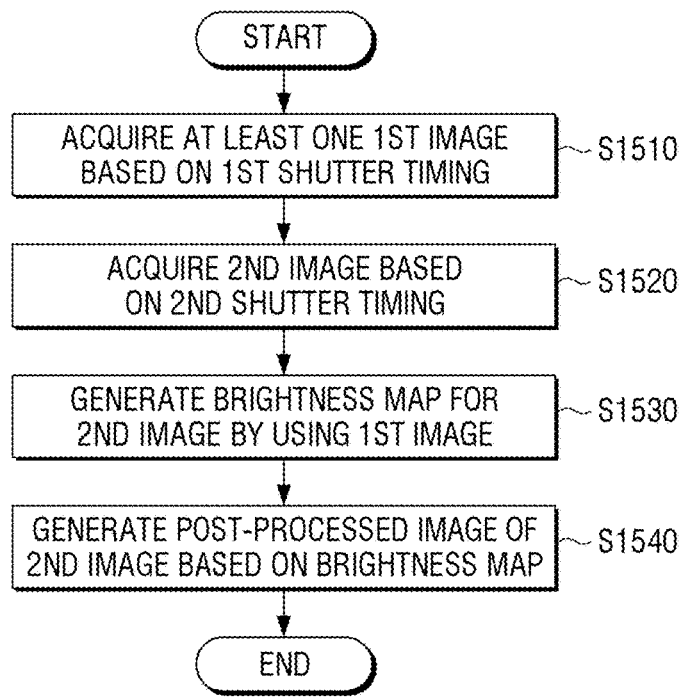

IMAGE PHOTOGRAPHING APPARATUS FOR PROVIDING OUT-OF-FOCUS EFFECT AND METHOD OF CONTROLLING THEREOF

CROSS-REFERENCE TO RELATED APPLICATIONS

This application is based on and claims priority under 35 U.S.C. § 119 to Korean Patent Application No. 10-2015-0165012, filed on Nov. 24, 2015 in the Korean Intellectual Property Office, the disclosure of which is incorporated by reference herein in its entirety.

BACKGROUND

1. Field

Apparatuses and methods disclosed herein relate generally to an image photographing apparatus, and a controlling method thereof, and for example, to an image photographing apparatus configured to process an image and provide an out-focus effect, and a controlling method thereof.

2. Description of Related Art

When a user of an image photographing apparatus such as a camera, and so on, or a user of an electronic device equipped with image photographing function such as a mobile phone, and so on photographs an image, an out-of-focus subject of photography can be converged on an image sensor. In this case, the Bokeh can occur, in which the subject of photography is in defocus state. Here, the 'Bokeh' refers to a photographic effect in which an out-of-focus part is blurred, that is, to out-focus effect.

Generally, because the size of Bokeh is proportional to the square of the lens focal distance, image with sufficiently large Bokeh is infrequently acquired with a short focal distance lens. Accordingly, a device with a short focal distance lens, such as a mobile device camera, and so on, would generate a rather monotonous image in which the entire image regions are in focus, that is, without having out-focus effect.

In order to overcome the limits mentioned above, attempts are recently made to provide a mobile device or compact system camera (CSC) with a high-end digital single lens reflex (DSLR) effect, by applying a technology of providing artificial out-focus image through image post-processing.

A related method of post-processing an out-focus image achieves out-focus effect by extracting depth information during image acquisition through a camera, distinguishing a close subject and a far subject in the acquired image, and blur-filtering an image region of a certain subject in the image selected by the user.

However, while this related image post-processing method can be effective when the entire subjects have uniform brightness, it is not able to achieve sufficient desired effect for an image such as a night photography that includes a presence of light source or reflected light. The reason for this will be further described below with reference to FIG. 1.

FIG. 1A illustrates an example of an image that is photographed by a phone camera with a focal distance as short as approximately 4 mm. The photographed image 100 includes point light sources 102, 103 of a main subject 101. Because the lens focal distance of the phone camera is fairly short, a range of entire driving distance of the lens to adjust the focal point to the entire depths is approximately 0.5 mm.

Accordingly, this means that it is very difficult to achieve Bokeh image effect by de-focusing of the point light sources 102, 103.

FIG. 1B illustrates an example of an image of the same object photographed in FIG. 1A, photographed with a DSLR camera equipped with a telephoto lens with a long focal distance and a small aperture value. Referring to the photographed image 110, the main subject 111 is in focus and thus expressed sharply, whereas the point light sources 112, 113 located in the far region are greatly de-focused and thus Bokeh image is generated. Because the total range of driving distance of the telephoto lens with long focal distance is several mm, when a focus is on the main subject in the near region, the subject in the far region is severely blurred. Accordingly, the point light sources 112, 113 in the far region generate large Bokeh, and this is how the Bokeh image that can be obtained in the high-end camera can be generated.

FIG. 1C illustrates an example of an image obtained as a result of distinguishing the image of FIG. 1A into a main subject and the far region, by out-focus post-processing the far region while keeping the main subject in the in-focus state. Referring to the out-focus post-processed image 100', the main subject 101' is expressed in focus, while most of the point light sources 102', 103' located in the background are disappeared.

Specifically, the point light sources 102, 103 of FIG. 1A are highly likely to be saturated within the pixels of the photographing element, since the point light sources 102, 103 have a considerably larger quantity of light compared to the adjacent background. That is, most pixels corresponding to the point light sources 102, 103 have maximum values. According to the related image post-processing method, in order to obtain out-focus effect, the output value of the pixels with maximum value is shared with the adjacent pixels, and according to this, the greater Bokeh effect is obtained by sharing many more output values to the adjacent pixels. Accordingly, after the blur filtering to obtain the Bokeh effect, only very weak signals are left, and thus almost all light sources 102', 103' disappear as illustrated in FIG. 1C.

FIG. 1D illustrates, when a pixel value (for example, brightness value) of the point light sources is 100%, a table which calculates a relation between a size of Bokeh (for example, radius) which may be generated through a blur filter according to the related art and brightness of Bokeh. As illustrated in FIG. 1D, when a size of Bokeh becomes 10 times greater, light amount substantially decreases to about 1%, and thus, when the Bokeh effect gets greater, the point light sources will eventually disappear.

That is, the simple blur filtering post-processing alone will not be able to render a Bokeh image of the point light sources 112, 113 that is as bright as in FIG. 1B.

As such, a technology is necessary, which can generate a Bokeh image appearing as natural as that photographed by a DSLR camera, by applying out-focus effect by post-processing an image photographed by a short focal distance lens, without having disappearance of the point light sources even with the increasing Bokeh size.

SUMMARY

Example embodiments of the disclosure address the above disadvantages and other disadvantages not described above.

According to an example embodiment, an image photographing apparatus and a controlling method thereof are provided, which can provide a natural-appearing Bokeh image effect by acquiring a brightness map for an image, and post-processing the image using the acquired brightness map.

According to an example embodiment, an image photographing apparatus is provided, which may include a camera configured to photograph an image, and a processor configured to control the camera to acquire a plurality of first images based on a first shutter timing and to acquire a second image based on a second shutter timing, to generate a brightness map of the second image using the acquired first images, and to generate a post-processed image of the second image using the generated brightness map.

While the plurality of first images are being composited, the processor may be configured to detect a saturation state of coordinate values of a composite image, to acquire brightness information of the coordinate values based on a number of the first images in which the coordinate values have saturation state, and to generate the brightness map based on the brightness information of the coordinate values.

When a brightness of the coordinate values of the composite image corresponding to a main subject included in the second image reaches a preset value, the process may stop compositing the plurality of first images.

The processor may be configured to adjust a resolution of the plurality of first images, and to composite the plurality of resolution-adjusted first images.

The processor may be configured to generate a depth map of the second image, to generate information on per-depth image coordinate sets of the second image and information on per-depth Bokeh corresponding to the per-depth image coordinate sets; and to perform post-processing of the second image by applying the corresponding per-depth Bokeh to each of the per-depth image coordinate sets respectively.

The processor may be configured to generate information on per-depth image coordinate sets of the second image by dividing the second image into coordinates having a same depth based on the depth map, to generate size information and shape information of the per-depth Bokeh based on information on a lens parameter set for the image photographing apparatus, the depth map and the per-depth image coordinate sets, and to generate magnitude information of the per-depth Bokeh based on the brightness map.

The processor may be configured to determine a size of the per-depth Bokeh using the equation below:

$$\Delta u = \left(\frac{1}{F\#}\right)\left(\frac{f}{a}\right)^2 \Delta z$$

where, '$\Delta u$' denotes a Bokeh size, 'F#' is F-number of a lens set for the image photographing apparatus, 'f' is a focal distance of the lens set for the photographing apparatus, 'a' is a distance between main subject of the second image and the lens, and '$\Delta z$' is a distance between the main subject of the second image and the object in background.

The processor may be configured to convert the determine size of the per-depth Bokeh based on a size of an image sensor included in the camera.

The processor may be configured to perform a convolution operation of the corresponding per-depth Bokeh for each of the per-depth image coordinate sets, to combine results of the convolution operations per depth, and to perform post-processing of the second image.

The image photographing apparatus may include input circuitry configured to receive an instruction (e.g., a user instruction), and a display configured to display a post-processed image of the second image. While the post-processed image of the second image is displayed, the processor may be configured to control the display to display a menu to adjust lens parameter including at least one user interface (UI) element corresponding to at least one lens parameter; and in response to an instruction input to the at least one UI element, may be configured to re-post-process the second image based on a lens parameter corresponding to the UI element through which the instruction is input, and to control the display to display the re-post-processed second image.

According to an example embodiment, a method of controlling an image photographing apparatus is provided, which may include acquiring a plurality of first images based on a first shutter timing and acquiring a second image based on a second shutter timing, generating a brightness map of the second image using the acquired first images, and generating a post-processed image of the second image using the generated brightness map.

The generating the brightness map may include compositing the plurality of first images, detecting a saturation state of coordinate values of a composite image while the plurality of first images are being composited, acquiring brightness information of the coordinate values based on the number of the first images in which the coordinate values have saturation state, and generating the brightness map based on the brightness information of the coordinate values.

The compositing the plurality of first images may include, when a brightness of the coordinate values of the composite image corresponding to a main subject included in the second image reaches a preset value, stopping compositing the plurality of first images.

The compositing the plurality of first images may include adjusting a resolution of the plurality of first images, and compositing the plurality of resolution-adjusted first images.

The method may include generating a depth map of the second image. The generating the post-process image may include generating information on per-depth image coordinate sets of the second image, and information on per-depth Bokeh corresponding to the per-depth image coordinate sets, and performing post-processing of the second image by applying the corresponding per-depth Bokeh to each of the per-depth image coordinate sets respectively.

The generating the information may include generating information on per-depth image coordinate sets of the second image by dividing the second image into coordinates having a same depth based on the depth map, and generating size information and shape information of the per-depth Bokeh based on information on a lens parameter set for the image photographing apparatus, the depth map and the per-depth image coordinate sets, and generating magnitude information of the per-depth Bokeh based on the brightness map.

The generating the information may include determining a size of the per-depth Bokeh using the equation below:

$$\Delta u = \left(\frac{1}{F\#}\right)\left(\frac{f}{a}\right)^2 \Delta z$$

where, '$\Delta u$' denotes a Bokeh size, 'F#' is F-number of a lens set for the image photographing apparatus, 'f' is a focal distance of the lens set for the photographing apparatus, 'a' is a distance between main subject of the second image and the lens, and 'Δz' is a distance between the main subject of the second image and the object in background.

The generating the information may include converting the determined size of the per-depth Bokeh based on a size of an image sensor included in the camera.

The performing the post-processing may include performing a convolution operation of the corresponding per-depth Bokeh for each of the per-depth image coordinate sets, and combining results of the convolution operations per depth.

The method may include, while displaying the post-processed image of the second image, displaying a menu to adjust lens parameter including at least one user interface (UI) element corresponding to at least one lens parameter, and in response to receiving an instruction input to the at least one UI element, re-post-processing the second image based on a lens parameter corresponding to the UI element through which the instruction is input, and displaying the re-post-processed second image.

According to various example embodiments described above, natural-appearing Bokeh image can be generated when out-focus effect is applied by post-processing a photographed image.

BRIEF DESCRIPTION OF THE DRAWINGS

The above and/or other aspects of the disclosure will be more apparent from the following detailed description, taken in conjunction with the accompanying drawings, in which like reference numerals refer to like elements, and wherein:

FIG. 2 is a diagram illustrating an example operation of an image photographing apparatus;

FIG. 15 is a flowchart illustrating an example method of operating an image photographing apparatus.

DETAILED DESCRIPTION

Figure 1A:
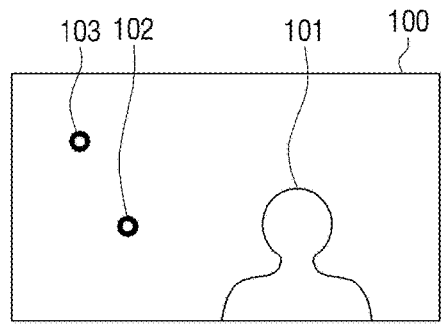
FIGS. 1A-1D are diagrams illustrating examples of problems occurring in the related technology.
Figure 1B:
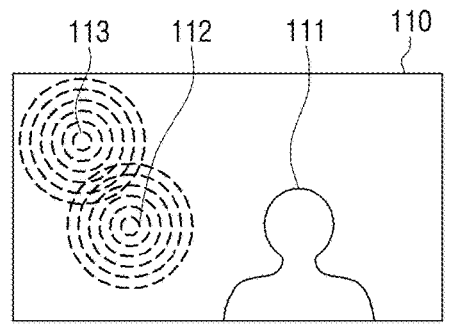
Figure 1C:
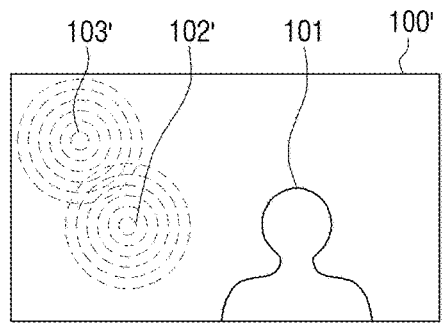
Figure 1D:
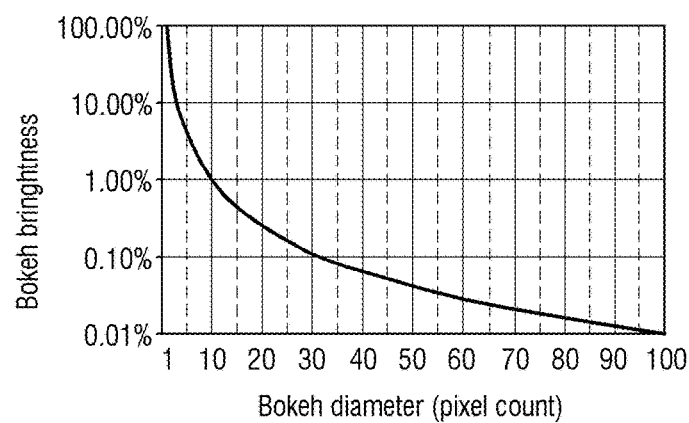

Terminology used herein will be explained briefly before describing example embodiments in greater detail.

While certain expression including ordinal number such as "first", "second", and so on may be used to describe a variety of configurations, the configurations are not limited by these expressions. These terms are used simply to distinguish one configuration from another. For example, without departing from the scope of the present disclosure, a first element may be referred to as a second element, and likewise, a second element may be referred to as a first element.

The term "comprise" or "have" as used herein, designates a presence of characteristic, number, step, operation, element, part described herein, or a combination of these, but does not foreclose the existence or possibility of adding one or more of another characteristics, numbers, steps, operations, elements, parts or a combination of these.

Unless specifically defined otherwise in the context, a singular expression encompasses a plural expression.

Further, a suffix "-er" used herein at the end of an element is provided for the purpose of convenience of drafting the description, and it does not give any distinguishing meaning or role per se.

Meanwhile, well-known functions or constructions may not be described in detail if they would obscure the description with unnecessary detail.

Hereinbelow, various example embodiments will be described with reference to the accompanying drawings.

FIG. 2 is a diagram illustrating an example operation of an image photographing system. FIG. 2 illustrates an image photographing system which may extract brightness information 221 and depth information 222 of a subject 10, and then generate an out-focus image 223 by image processing.

Referring to FIG. 2, the subject 10 may include a main subject 201 and point light sources 202, 203 positioned at different distances (e.g., background) from the main subject 201. The main subject 201 and the point light sources 202, 203 each include brightness information and depth information.

The camera 210 may be a camera that can extract high definition image information and depth information of the subject 10. In order to obtain the depth information, the camera 210 may use, for example, time of flight (TOF) method, light field method, or a laser scanning depth information extracting device, or focus bracketing method or depth from defocus (DFD) method.

The processor (e.g., including processing circuitry, such as, for example, a CPU, GPU, or the like) 220 may include, for example, an image signal processor (ISP) for example that processes an image signal acquired through the camera 210. The processor 220 may be configured to determine the brightness information and the depth information of the objects 201 to 203 present in the subject 10 to thus generate a brightness map 221 and a depth map 222. The processor 210 may also be configured to perform post-processing of an image using the generated brightness map 221 and the depth map 222 to generate out-focus effect.

For example, the processor 220 may be configured to control the camera 210 to photograph the subject 10 with a general shutter speed to acquire a second image for which the out-focus effect is generated. Further, the processor 220 may be configured to extract depth information of the second image using any of a variety of methods described above to generate a depth map 222 of the second image. Further, the processor 220 may be configured to control the camera 210 to photograph the subject 10 in the same manner as the second image with a very short exposure time, for a plurality of times, and then process a plurality of acquired first images 211 to generate a brightness map 221 of the second image.

In the meantime, in the aforementioned exemplary embodiments, it is described that the subject 10 which is the same as the second image is photographed for a plurality of times with a very short exposure time, but this is merely exemplary, and the processor 220 may control the camera 210 to photograph the first image once. In particular, when a subject such as a night photography with light amount that is greater than that of background is included, the processor 220 may control the camera 210 to photograph the first image once.

By post-processing the second image with the generated brightness map 221 and depth map 222, the processor 220 may be configured to generate a post-processed image 223 of the second image in which out-focus effect that appears to be that which can be obtained with a high-end DSLR equipped with telephoto lens.

Hereinbelow, a configuration and an operation of an image photographing apparatus will be described in greater detail with reference to FIG. 3. The 'image photographing apparatus 300' as used herein may refer, for example, to a variety of electronic devices that have a short focal distance lens to photograph an image, and for example, may be implemented as a mobile device such as mobile phone, PDA, tablet, laptop computer, smart glasses, smart watch, PMP, MP3 player, and so on, but is not limited thereto. The image photographing apparatus 300 may be implemented as a display apparatus such as TV, or as a camera such as a compact system camera (CSC), or the like. For example, the example embodiments described herein are applicable to any type of image photographing apparatus that can generate an out-focus effect by post-processing a photographed image.

Figure 3:
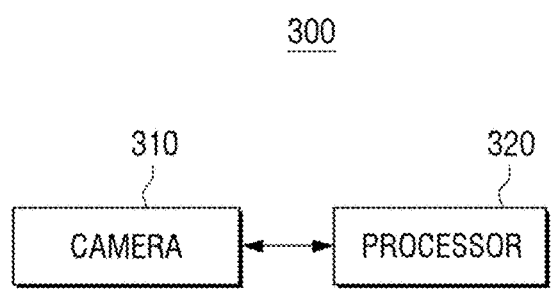
FIG. 3 is a block diagram illustrating an example image photographing apparatus.

According to FIG. 3, the image photographing apparatus 300 may include, for example, a camera 310 and a processor 320. The camera 310 is an element used to photograph an external subject. The 'external subject' as used herein may include, for example, a plurality of subjects including the background.

For example, the camera 310 may photograph the external subject while varying shutter timing under control of the processor 320. Accordingly, the camera 310 may acquire a plurality of first images based on a first shutter timing, and acquire a second image based on a second shutter timing (see, e.g., 211 of FIG. 2 above).

For example, under the control of the processor 320, the camera 310 may acquire a plurality of first images by photographing a same subject including a plurality of subjects with a first shutter timing for a plurality of times, and acquire a second image by photographing the same subject as the first images with a second shutter timing. In this example, the first shutter timing may be relatively shorter than the second shutter timing.

The camera 310 may include, although not illustrated, a lens, an iris, a shutter, an analog front end, a timing generator, a photographing element (or image sensor), and so on.

Further, the photographer 310 may further include configurations necessary to acquire the depth information of the photographed images so that the processor 320 is configured to extract the depth information of the subjects included in the photographed images and to generate the depth map.

For example, the camera 310 may additionally include configurations necessary so that the processor 320 may acquire the depth information of the photographed images using any of a variety of methods including, for example, stereo camera method, time of flight (TOF) method, light-field method, laser scanning method, focus bracketing method, depth from defocus (DFD) method, and so on.

For example, the camera 310 may include two or more camera modules so that the processor 320 may be configured to acquire the depth information with the stereo camera method, or may include a transmitter and a receiver to transmit a light and receive a reflected light so that the processor 320 may be configured to acquire the depth information with the TOF method. Further, the camera 310 may include a micro lens array so that the processor 320 may be configured to acquire the depth information with the light field method.

Further, the camera 310 may include a separate unit to extract laser scanning depth information so that the processor 320 may be configured to acquire the depth information based on a laser scanning method, and may include necessary configurations so that the processor 320 may be configured to acquire the depth information with the focus bracketing method or DFD method.

As described above, the camera 310 may include various configurations to acquire the depth information, which will not be described in detail below as this would be known to those skilled in the art and is not necessary for the describing the various example embodiments of the disclosure.

The processor 320 is configure to control the overall operation of the image photographing apparatus 300. For example, the processor 320 may be configured to control the camera 310 to acquire a plurality of first images and the second images as described above.

For example, the processor 320 may be configured to generate a first shutter timing control signal corresponding to the first shutter timing, and a second shutter timing control signal corresponding to the second shutter timing, and to transmit the same to the camera 310. Accordingly, the camera 310 may acquire the first images by controlling exposure time of the aperture shutter or the photographing element based on the received first shutter timing control signal, and acquire the second images by controlling the exposure time of the aperture shutter or the photographing element based on the second shutter timing control signal.

Meanwhile, when a subject being photographed includes a light source with a relatively large quantity of light, it may be difficult to extract the absolute quantity of the light because the pixels of the photographing element corresponding to the light source may be immediately saturated. According to an example embodiment, the processor 320 may be configured to prevent and/or reduce immediate saturation of even a subject with large quantity of light by decreasing the first shutter timing and thus reducing the exposure time.

In still another exemplary embodiment, the processor 320 may control the camera 310 to photograph the first image photographed based on the first shutter timing for once, instead of a plurality of times. In this case, the step of compositing the plurality of first images which is to be described later may be omitted.

Further, the processor 320 may be configured to control the camera 310 to acquire a plurality of first images and then directly acquire the second image, or may be configured to control the camera 310 to acquire the second image and then directly acquire a plurality of first images. In situations such as when the camera 310 includes two or more camera modules and is thus capable of concurrently acquiring two or more images of the same subject, a plurality of first images may be acquired through one camera module, while the second image is acquired with the other camera module.

The processor 320 may be configured to generate a brightness map of the second image using the plurality of first images, and to generate post-processed image of the second image using the generated brightness map.

For example, the processor 320 may be configured to accumulatively composite the acquired first images one by one. Since the first images are images of the same subject photographed based on the first shutter timing for a short exposure time, the composite image becomes gradually brighter as an additional first image is composited. In this process, the subjects included in the first image are saturated in the order of brightness.

Accordingly, during compositing of the first images, the processor 320 may be configured to detect the saturation state of the coordinate values of the composited image, and to acquire the brightness information of the coordinate values based on the number of composited first images that have the saturation state of the coordinate values. For example, the processor 320 may be configured to acquire information about absolute brightness of the subjects included in the first images, and relative brightness differences among the subjects included in the first images.

Since the first images are photographed images of the same subject as the second image, the processor 200 may be configured to generate a brightness map of the second image based on the acquired brightness information of the coordinate values of the first images.

When the brightness of the coordinate values of the composite image corresponding to the main subject included in the second image reaches a preset value, the processor 320 may be configured to stop compositing the first images. The 'main subject' as used herein may refer, for example, to an in-focused subject among the subjects included in the photographed subject. As described above, the number of first images being composited for the purpose of generating brightness map may be limited by stopping the first image compositing when the brightness of the main subject reaches the preset value.

In this example, the processor 320 may be configured to stop compositing the first images by controlling the camera 310 to stop acquiring the first images, or the processor 320 may be configured to stop compositing even when there are first images already acquired.

Further, according to an example embodiment, the processor 320 may be configured to adjust the resolution of the acquired first images, and to generate a brightness map of the second image by compositing the resolution-adjusted first images. For example, the processor 320 may be configured to increase the speed of generating the brightness map by decreasing the resolution of the first images from the original resolution and performing compositing.

Meanwhile, the processor 320 may be configured to generate a post-processed image of the second image using the brightness map generated as described above. For example, the processor 320 may be configured to generate a depth map of the second image, and to generate, using the generated depth map and brightness map, per-depth image coordinate sets of the second image and information about Bokeh corresponding to each of the per-depth image coordinate sets. The processor 320 may be configured to then post-process the second image by applying per-depth Bokeh corresponding to the respective per-depth image coordinate sets.

For example, the processor 320 may be configured to generate a depth map of the second image using any of a variety of methods, such as the methods described above. The specific details of the processor 320 generating a depth map will not be described herein, as this would be unnecessary.

Further, the processor 320 may be configured to generate information about per-depth image coordinate sets of the second image using the generated depth map. For example, because a depth map of a specific image includes depth information of respective coordinates of the corresponding image, the processor 320 may be configured to divide the second image into coordinates of same depth using the depth map of the second image, and to generate information about the per-depth image coordinate sets of the second image.

Further, the processor 320 may be configured to generate size information and shape information of the per-depth Bokeh, based on a lens parameter set for the image photographing apparatus 300, the depth map, and the information about the per-depth image coordinate sets.

The lens parameter set for the image photographing apparatus 300 may refer, for example, to a condition to determine size or shape of the Bokeh to be used during post-processing of the second image by the processor 320, and this may include, for example, one or more of F-number, focal distance, and aperture shape. Such lens parameters may have a preset default value, or may be set by a user.

Accordingly, the processor 320 may be configured to determine the size and shape of the per-depth Bokeh to be applied to the per-depth image coordinate sets, using the lens parameter, the depth map of the second image, and the information about the per-depth image coordinate sets.

For example, the processor 320 may be configured to determine the size of the per-depth Bokeh using, for example, the equation [1] below:

$$\Delta u = \left(\frac{1}{F\#}\right)\left(\frac{f}{a}\right)^2 \Delta z \qquad \text{[Equation 1]}$$

where, '$\Delta u$' denotes Bokeh size, '$F\#$' is F-number of a lens set for the image photographing apparatus, '$f$' is a focal distance of the lens set for the photographing apparatus, '$a$' is a distance between main subject of the second image and the lens, and '$\Delta z$' is a distance between the main subject of the second image and the object in the background.

In this example, depending on example embodiments, the processor 320 may be configured to convert the determined per-depth Bokeh size based on a size of an image sensor included in the camera 310. This is because when the image photographing apparatus is a phone camera implemented in a mobile phone, there is a certain conversion ratio in the determined Bokeh size due to a size difference between a full frame DSLR image sensor and a phone camera image sensor. This will be described in greater detail below with reference to FIG. 13.

Further, the processor 320 may be configured to determine the shape of Bokeh based on the shape of aperture as the lens parameter.

Further, the processor 320 may be configured to generate magnitude information of per-depth Bokeh based on the brightness map. For example, because the brightness map includes actual brightness information of the respective coordinates of the second image, the processor 320 may be configured to generate magnitude difference even for the Bokeh of same size and shape by referring to the brightness map of the second image.

As described above, the processor 320 may be configured to generate information about per-depth Bokeh to be applied to the per-depth image coordinate sets respectively, e.g., the information about size, shape, and magnitude of the per-depth Bokeh.

Accordingly, the processor 320 may be configured to perform post-processing of the second image by respectively applying corresponding per-depth Bokeh to the respective per-depth image coordinate sets. For example, the processor 200 may be configured to perform post-processing of the second image by determining a convolution operation on the corresponding per-depth Bokeh for the respective per-depth image coordinate sets, and combining the results of the per-depth convolution operations.

As described above, when generating out-focus effect by post-processing an image photographed with a short focal distance lens, it is possible to generate Bokeh image appearing natural as if it is photographed with a DSLR camera, without having significant loss of point light sources even with the increasing Bokeh size. Further, fast operation speed and soft out-focus image post-processing are enabled, by adopting a method that divides the second image into per-depth image coordinate sets and applies corresponding Bokeh to respective per-depth image coordinate sets and performs compositing.

Meanwhile, an example embodiment has been described above with reference to an example in which the image photographing apparatus 300 is implemented as one single apparatus. However, example embodiments are not limited to the specific example provided above. Accordingly, for example, an image photographing system including a camera 310 and a processor 320, which are separate apparatuses and may be connected to each other by a variety of communication methods, may also be included in the scope of the image photographing apparatus 300 according to an example embodiment.

Hereinbelow, a configuration and an operation of an image photographing apparatus will be described in greater detail below with reference to FIGS. 4 to 14.

Figure 4:
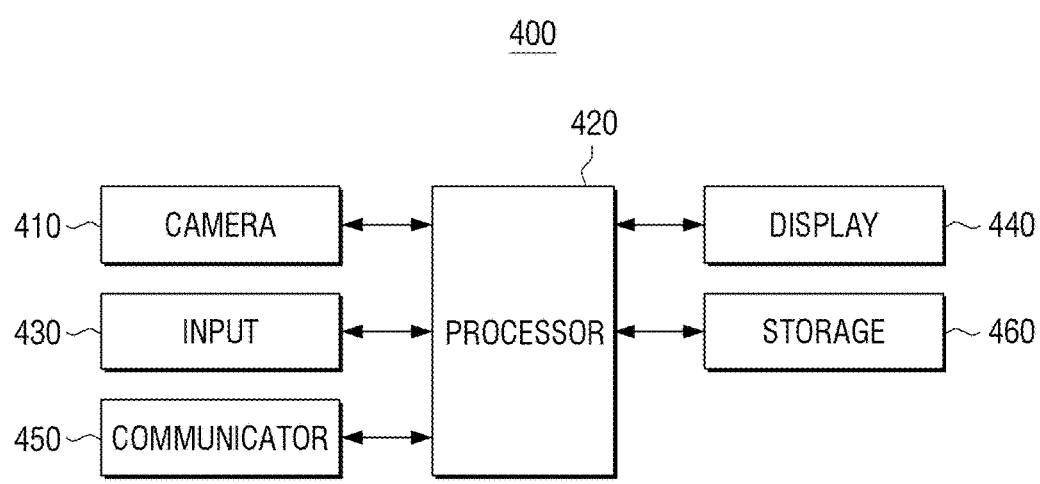
FIG. 4 is a block diagram illustrating an example image photographing apparatus.

FIG. 4 is a block diagram illustrating an example configuration of an image photographing apparatus. As illustrated in FIG. 4, the image photographing apparatus 400 may include a camera 410, a processor 420, an input (e.g., including input circuitry, such as, for example, a touch screen, a physical key, a soft key, etc.) 430, a display (e.g., including a display panel and display driving circuitry) 440, a communicator (e.g., including communication circuitry) 450, and a storage (e.g., a memory) 460.

FIG. 4 illustrates elements of an example image photographing apparatus 400 implemented as, for example, a mobile device such as a smart phone that is equipped with communication function, display function, and so on. Accordingly, depending on example embodiments, part of the elements illustrated in FIG. 4 may be omitted or modified, or other elements may be added.

Further, among the configurations of FIG. 4, the camera 410 and the processor 420 may be configured to perform all of the functions of the camera 410 and the processor 310 described above with reference to FIG. 3. Accordingly, overlapping operations and configurations may not be repeated below.

The camera 410 may be a configuration that photographs an external subject including at least one subject. Although not illustrated, the camera 410 may include a lens, a shutter, an iris, an image sensor (or photographing element), an analog front end (AFE), and a timing generator (TG), etc.

The lens (not illustrated) may be a configuration to which a reflected light from the subject enters, and may include at least one lens among a zoom lens and a focus lens.

The shutter (not illustrated) may adjust time the light enters the image sensor. According to the shutter timing control signal generated by the processor 420, the shutter speed is controlled, and accordingly, quantity of light accumulated on the exposed pixels of the image sensor is determined.

The iris (not illustrated) may adjust the quantity of light past the lens and entering the image sensor. The iris may have a mechanical structure to gradually increase or decrease the size of aperture to adjust the quantity of incident light. The opening degree of the iris may be represented by aperture number called an 'F-number', and because the opening degree increases with smaller aperture number, the increased quantity of incident light may generate brighter image.

The image sensor (not illustrated) may be a configuration where an image of the subject past the lens is converged. The image sensor may include a plurality of pixels disposed in matrix pattern. Each of a plurality of pixels may accumulate a photocharge and output an image as an electrical signal.

In this example, the image sensor may be configured as a photographing element such as a complementary metal oxide semiconductor (CMOS), a charge coupled device (CCD), and so on.

Further, the image sensor may include a photo diode PD, a transmit transistor TX, a reset transistor RX, and a floating diffusion node FD, or the like. The photodiode PD may generate photocharge corresponding to the optical image of the subject and accumulates the same. In response to a transmit signal, the transmit transistor TX transmits the photocharge generated at the photo diode PD to the floating diffusion node FD. The reset transistor releases charges stored at the floating diffusion node FD in response to a reset signal. The charges stored at the floating diffusion node FD are outputted before application of a reset signal, in which case the CDS image sensor may perform correlated double sampling (CDS) processing. The analog-to-digital converter (ADC) may then convert the CDS-processed analog signal into a digital signal.

Under control of the processor 420, the timing generator TG may output a timing signal to readout pixel data of the image sensor, or output a timing signal to control exposure time of the aperture shutter.

Under the control of the processor 420, the analog front end (AFE, not illustrated) may sample the electrical signal on the subject output from the image sensor, and digitize the same.

The image sensor may be designed to a different configuration that can replace AFE and TG. For example, when the image sensor is implemented as a CMOS type, these configurations may be unnecessary.

The camera 410 may be disposed on one side (e.g., upper end) of the image photographing apparatus 400 to photograph an external subject, but is not limited thereto. Further, not only the camera 410 integrated with the image photographing apparatus 400, but a separated type may also be implemented. A separated camera 410 may be connected to the image photographing apparatus 400 by a wired manner or via a wireless network. Further, depending on example embodiments, the camera 410 may include a plurality of cameras.

The display 440 displays various images under control of the processor 420. For example, the display 440 may display a second image acquired through the photographer 410 or a post-processed image of the second image.

Further, the display 440 may display a menu to adjust lens parameter. The menu to adjust lens parameter may be that through which a user is able to set a lens parameter to apply during image photographing, such as, for example, focal distance, F-number, aperture shape, and so on. The menu to adjust lens parameter may include at least one UI element corresponding to at least one lens parameter.

Further, the display 440 may display a focal region select UI to select a focal region which is a region that the user wants to be in-focus in the second image.

Further, the display 440 may display a combination sequence set UI to set a sequence of combining the results of the per-depth convolution operation of the second image.

The display 440 may be implemented as various types of displays including liquid crystal display (LCD), organic light emitting diodes (OLEDs), plasma display panel (PDP), and so on, or may be implemented as a touch screen.

The input 430 may receive various user instructions to control the overall operation of the image photographing apparatus 400. For example, the input 420 may be implemented as various input devices that can control the image photographing apparatus 400, such as, buttons, touch panel, pointing device, remote control, and so on.

For example, the input 430 may receive an input of a user instruction to control the image photographing apparatus 400 on the various UIs displayed on the display 440.

For example, the input 430 may receive an input of a user instruction to display the second image acquired through the camera 410, or to display a post-processed image of the second image. Further, the input 430 may receive a user instruction to set a lens parameter to be applied during image photographing, such as focal distance, F-number, aperture shape, and so on, through the menu to adjust lens parameter.

Further, the input 430 may receive an input of a user instruction to select a focal region in the second image, and may also receive a user instruction to set a sequence of combining the results of per-depth convolution operations of the second image.

The communicator 450 may perform communication with an external apparatus such as an external mobile device, an external server, and so on. The communicator 450 may include one or more communication module among a short-range wireless communication module (not illustrated) and a wireless LAN communication module (not illustrated), or the like.

The 'short-range wireless communication module' (not illustrated) as used herein refers to a communication module that performs wireless communication with an external apparatus at a close distance, and may include, for example, a Bluetooth module, a ZigBee module, an NFC module, and so on. Further, the wireless LAN communication module (not illustrated) refers to a module that performs communication while being connected with an external network according to a wireless communication protocol such as WiFi, IEEE, and so on. Further, the communicator 450 may additionally include a mobile communication module that connects to a mobile communication network and performs communication according to a variety of mobile communication specifications such as 3rd generation (3G), 3rd generation partnership project (3GPP), long term evolution (LTE), and so on.

Further, the communicator 450 may include at least one of wired communication module (not illustrated) such as high-definition multimedia interface (HDMI), universal serial bus (USB), institute of electric and electronic engineer (IEEE) 1394, RS-232, and so on.

According to an instruction received through the input 430, the communicator 450 may transmit the first image, the second image, and the post-processed image of the second image to an external apparatus, under control of the processor 420.

The storage 460 may store a variety of programs and data necessary for the operation of the image photographing apparatus 400. Further, the storage 460 may store a variety of information or data generated or acquired during operation of the image photographing apparatus 400.

For example, the storage 460 may store a variety of program modules for the operation of the image photographing apparatus 400. For example, the storage 460 may store a base module, a communication module, and a service module (not illustrated). The base module (not illustrated) refers to a basic module that processes the signals transmitted from each hardware included in the image photographing apparatus 400 and transmit the same to an upper layer module. Although not illustrated, the base module may include a storage module, a security module, a network module, and so on. The storage module (not illustrated) is a program module that manages database DB or registry. The security module (not illustrated) is a program module that supports hardware certification, request permission, secure storage, and so on, and the network module (not illustrated) refers to a program module to support network connection and includes DNET module, UPnP module, and so on. The communication module (not illustrated) refers to a module to perform external communication. The communication module may include a messaging module (not illustrated), and a telephone module (not illustrated). The service module (not illustrated) refers to a module that includes various applications to provide various services.

Meanwhile, according to an example embodiment, the processor 420 may be configured to read the program module stored at the storage 460 and to perform an operation according to various example embodiments. For example, while the configurations of the processor 520 of FIG. 5, or the configurations of the processor 800 of FIG. 8 may be implemented as hardware, these may also be implemented as the program modules which, when executed by the processing hardware, cause the apparatus to perform the various functions of the program modules.

Figure 5:
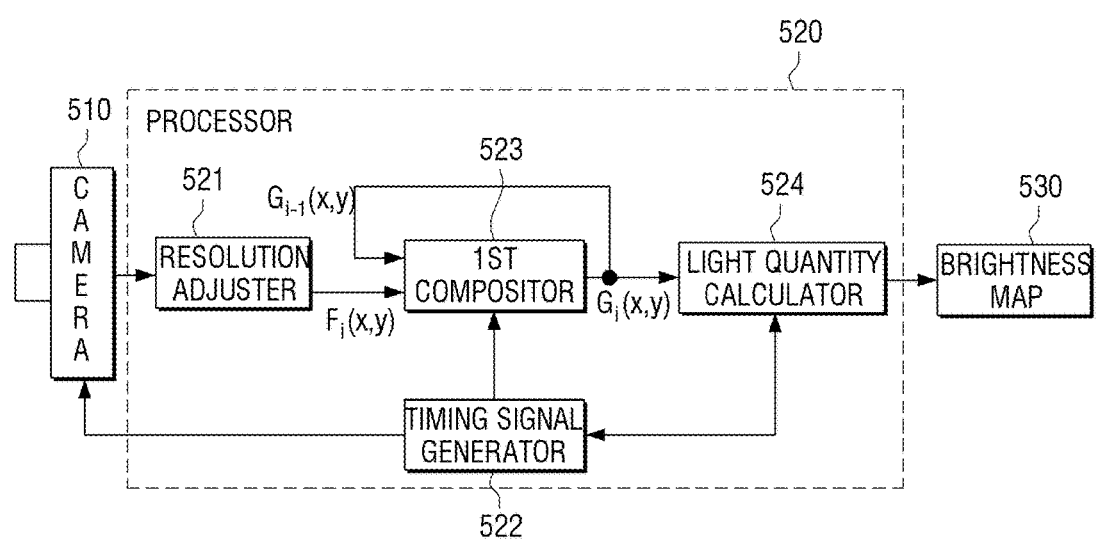
FIG. 5 is a diagram illustrating an example operation of an image photographing apparatus acquiring a brightness map.

As described above, when the processor 420 may be configured to read the module storage at the storage 460 and to perform an operation according to various example embodiments, the storage 460 may store resolution adjustment module, timing generation module, first composition module, and light quantity calculation module (not illustrated) that correspond to the respective configurations of the processor 520 of FIG. 5. Further, the storage 460 may store Bokeh kernel map generation module, per-depth image coordinate set generation module, convolution operation module, and a second composition module that correspond to the respective configurations of the processor 800 of FIG. 8.

Figure 8:
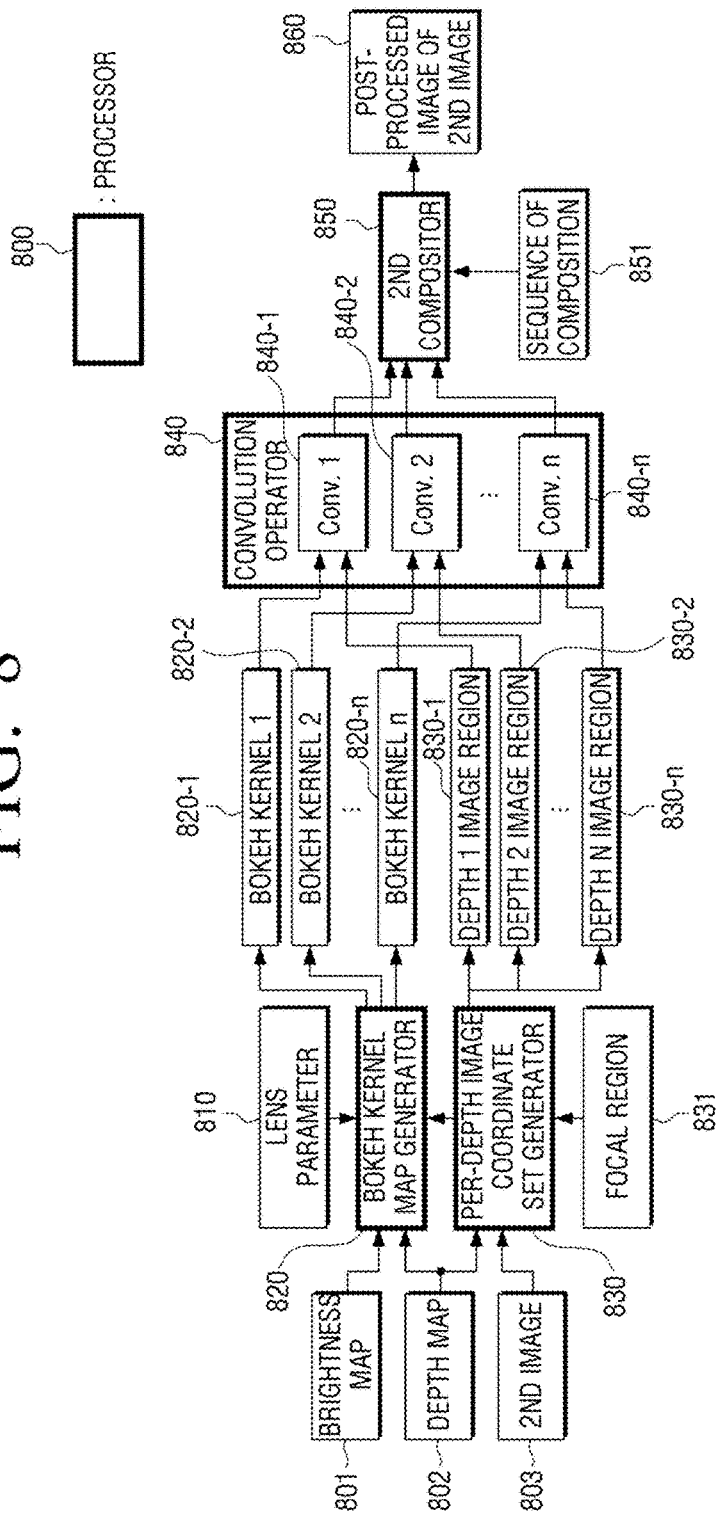
FIG. 8 is a diagram illustrating an example operation of an image photographing apparatus generating a post-processed image of a second image using a brightness map and a depth map.

The functions and operations of these modules corresponding to the configurations of the processors 520, 800 will be referred to in the description provided above and with reference to the configurations of the respective processors 520, 800 illustrated in FIGS. 5 and 8.

The storage 460 may store information that is necessary for the operation of the image photographing apparatus 400, such as, a brightness map and depth map of the second image generated by the processor 420, a first image and second image acquired through the camera 410, a post-processed image of the second image by the processor 420, lens parameter information, focal point detection region information, information on sequence of compositing convolution-calculated image coordinate sets, and so on.

The processor 420 may be configured to control the overall operation of the image photographing apparatus 400. For example, the processor 420 may be configured to control the camera 410 to acquire a plurality of first images based on the first shutter timing, and to acquire the second image based on the second shutter timing. The processor 420 may further be configured to generate a brightness map of the second image using the acquired first images, and may be configured to generate a post-processed image of the second image using the generated brightness map.

In this example, the processor 420 may be configured to include a separate image signal processor to process image signals, but example embodiments are not limited thereto. Accordingly, the processor 420 may be implemented as a universal processor such as an application processor.

Hereinbelow, details of the processor 420 generating a brightness map will be described with reference to FIGS. 5 to 7. FIG. 5 is a diagram illustrating an example operation of the image forming apparatus acquiring a brightness map.

The camera 510 in FIG. 5 may have the same configuration as the cameras 310, 410 in FIGS. 3 and 4. Under the control of the processor 520, the camera 510 may photograph at least one first image based on the first shutter timing, and provide the photographed image signals to the processor 520. The overlapping operation or configuration will not be repeated below. When i is 1, the camera 510 may photograph one first image based on the first shutter timing.

The processor 520 is represented as a block unit of a certain function of the processor 420 that is used for the purpose of brightness map generation, and may include a resolution adjuster (e.g., including resolution adjusting circuitry or functionality) 521, a timing signal generator 522, a first compositor 523, and a light quantity calculator 524.

The resolution adjuster 521 may adjust the size of image output from the camera 510. For example, the resolution adjuster 521 may greatly enhance the speed of generating brightness map by decreasing the resolution from the original resolution through binning, sub-sampling, and so on. Meanwhile, depending on example embodiments, the output from the camera 510 may be directly bypassed to the first compositor 523, e.g., without passing through the resolution adjuster 521.

The timing signal generator 522 generates a shutter timing control signal for the camera 510 to photograph an external subject. The shutter timing control signal refers to a signal transmitted to the camera 510 to control the time of acquiring images through the camera 510, and may be used for controlling the aperture shutter included in the camera 510, or for controlling the exposure time of the photographing element electrically included in the camera 510.

Further, the timing signal generator 522 may provide an additional operation timing signal for the first compositor 523 to composite the first images.

Meanwhile, the timing signal generator 522 may adaptively adjust the timing signal based on circumstances of photographing. For example, the timing signal generator 522 may vary the frame per second (FPS) of the generated timing signal, and vary the duty ratio of the timing signal in the same FPS circumstance.

Referring to FIG. 5, Fi(x,y) represents image information of the first image acquired through the camera 510 and past the resolution adjuster 521, and Gi(x,y) represents image information of the first image composited through the first compositor 523. Further, 'i' denotes a positive integer that represents the number of first images acquired by the camera 510, and (x, y) represents image coordinates of the brightness map 530.

The first compositor 523 may accumulate the image signals output from the resolution adjuster 521. 'Gi(x,y)' represents the result of calculation at the first compositor 523. Gi(x,y) becomes the image information in such a form that is added with Gi−1(x,y) that is previous information of Fi(x,y) and Gi(x,y).

For example, when it is assumed that the initial image output information of the resolution adjuster 521 is F1(x,y), G0(x,y) also input to the first compositor 523 will be '0'. Accordingly, the initial output information G1(x,y) of the first compositor 523 is F1(x,y), and the second output information G2(x,y) of the first compositor 523 is F2(x,y)+G1(x,y). As a result, the first compositor 523 provides an effect of accumulating the output information of the resolution adjuster 521.

The light quantity calculator 524 may calculate absolute light quantity of image coordinates (x, y) based on the output Gi(x,y) of the first compositor 523. The light quantity calculator 524 may measure the absolute light quantity of the light arriving at the photographing element of the photographer 510, using information such as a parameter F/#, ISO, exposure, shutter timing, and so on that adjust brightness of the image acquired at the photographer 510.

For example, when a very bright light source is photographed, the shutter speed has to be fast (that is, shutter timing has to be very short), and the ISO has to be as low as possible in order to prevent saturation of the pixel output of the photographing element. The light quantity calculator 524 may control the timing signal generator 522 to adjust the shutter timing to be very short, and thus calculate the light quantity of the light source having large light quantity.

Based on the light quantity of image coordinates (x, y) calculated as described above, the light quantity calculator 524 may generate a brightness map 530 of the image, and the generated brightness map 530 may be stored at the storage 460.

Further, the light quantity calculator 524 may adjust the number of first images acquired through the camera 510 by controlling the timing signal generator 522.

When there are more first images composited by the first compositor 523, more accurate brightness of the image may be extracted. For example, at Gi(x, y), more accurate brightness map 530 may be generated as 'i' increases.

Accordingly, in order to optimize T, the light quantity calculator 24 may, for example, limit the number (i) of first images for brightness map acquisition by stopping the acquisition of the first images for the brightness map generation, once the main subject is focused and when the brightness of the main subject reaches a preset value.

Referring to FIG. 5, when 'i' is small at Gi(x, y), meaningful photographing element pixel output values are detected in the photographed subject from only the subject such as a point light source that has a relatively larger light quantity. Next, as 'i' increases, the photographing element corresponding to the point light source subject becomes saturated, and the meaningful pixel output values are detected from the photographing element that corresponds to a relatively darker subject. That is, increased 'i' provides an effect equivalent to increased exposure.

Because the first compositor 523 accumulatively composites the first images, the value once saturated at the arbitrary coordinates (x, y) of Gi(x, y) will remain saturated, and according to an example embodiment, 'i' keeps increasing until the brightness value of the coordinates corresponding to the main subject reaches a preset value.

The reason that the brightness information of the coordinates remaining in saturated state can be distinguished even with the continuously increasing 'i' is that the respective coordinate values have different 'i' at which these begin saturating, and therefore, it is possible to determine absolute light quantities of the respective coordinates of the image.

Given the principle described above, the light quantity calculator 524 is able to calculate not only the absolute light quantities of the subjects included in the subject photographed through the camera 510, but also the relative light quantity differences among the subjects.

FIGS. 6A-6D illustrate an example process of compositing a plurality of first images. For example, FIGS. 6A to 6D illustrate changes in Gi(x, y) of the example of FIG. 5 as 'i' increases to i1, i2, i3, i4.

Figure 6A:
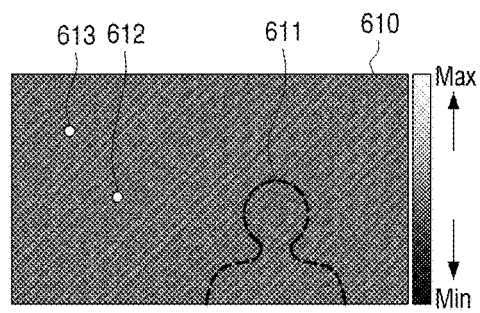
FIGS. 6A-6D are diagrams illustrating an example process of compositing a plurality of first images.

FIG. 6A illustrates an output image G1(x, y) 610 of the first compositor 523 when i=i1, in which reference numeral 611 denotes a main subject, and 612 and 613 denote point light sources in the background. In this example, the brightness of the main subject 611 is not detected yet, and as illustrated, the brightness is started to be detected from the point light sources 612, 613 having a considerably greater light quantity than the background.

Figure 6B:
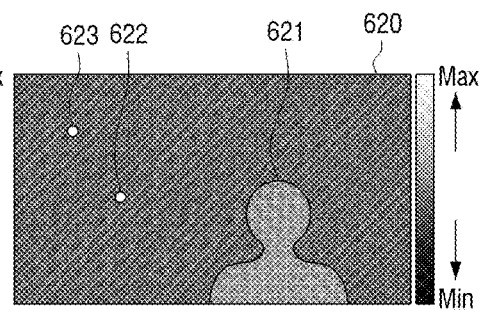

FIG. 6B illustrates an output image G2(x, y) 620 of the first compositor 523 when i=i2. In this example, since the first image is accumulated for i=i2 times, the brightness is started to be weakly detected from the main subject 621, and as illustrated, the point light sources 622, 623 are in saturated state.

Figure 6C:
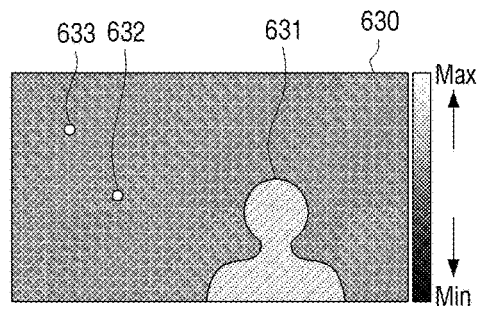

FIG. 6C illustrates an output image G3(x, y) 630 of the first compositor 523 when i=i3. In this example, since the first image is accumulated once more (i.e., accumulated for i=i3 times), the main subject 531 is detected more brightly, and the point light sources 632, 633 remain in saturated state.

Figure 6D:
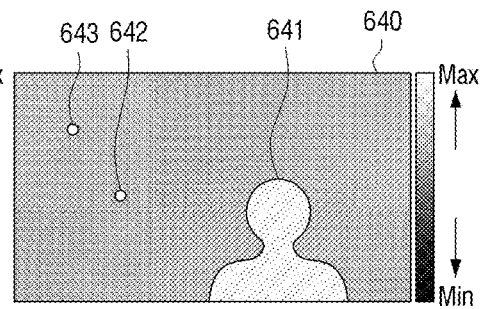

FIG. 6D illustrates an output image G4(x, y) 640 of the first compositor 523 when i=i4. In this example, since the first image is accumulated for i=i4 times, the main subject 641 begins saturating, and the point light sources 642, 643 remain in the saturated state.

As described above, the value that is once saturated at arbitrary coordinates (x, y) of Gi(x, y) will remain in the saturated state, and i continues increasing until the brightness value of the main subject reaches a preset value.

Referring to FIGS. 6A to 6D, the respective coordinate values corresponding to the subject have different 'i' values at which saturation begins, and therefore, the light quantity calculator 524 may calculate the absolute light quantity and relative light quantity differences of the main subject, point light sources, and surrounding background.

Accordingly, since the brightness difference between the main subject and the point light source of the subject may be given, and the coordinates of a very bright subject such as point light source may be accurately distinguished, it is possible to know the coordinates in need of enhancement in the post-processing such as out-focusing, and so on. As a result, natural image processing is enabled.

For example, when it is assumed that the pixel saturation output value is maximum 100% in the general photographing circumstance, the brightness of the main subject is generally adjusted to an exposure value corresponding to 50%. Accordingly, when photographing a subject as in FIG. 1A for example, the output value of the main subject 101 will correspond to 50%, while the point light sources 102, 103 are saturated and thus have 100% output value. In this example, since no information is provided about the reference numerals 102, 103 being the point light sources, general out-focus post-processing is performed along with the background, and the out-focus image by the point light sources would not be obtained.

On the other hand, it is possible to use the brightness map 530 of the image generated with the method as illustrated in FIG. 5, in which case, even when the point light sources 102, 103 have a brightness value that is 10 times or 100 times higher than the main subject 101, the absolute brightness values or a relative brightness difference of the point light sources 102, 103 are known, and it is thus confirmed that reference numerals 102, 103 are point light sources. Accordingly, the point light sources can be expressed significantly greater than in the general post-processing method, in the out-focus post-processing. As a result, the Bokeh image that can be acquired with a high-end DSLR equipped with telephoto lens may appear to be obtained with the out-focus post-processing.

Figures 7A, 7B:
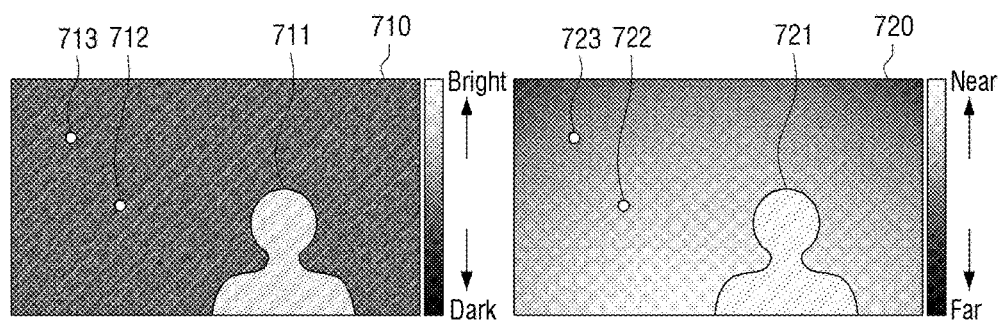
FIGS. 7A and 7B illustrate an example brightness map and an example depth map, respectively.

FIGS. 7A and 7B illustrate an example brightness map 710 and an example depth map 720 generated by the processors 320, 420, 520. For example, FIG. 7A illustrates a result of calculating a brightness map at the processors 320, 420, 520, in which the difference of light quantities between the main subject 711 and the point light sources 712, 713 in the background may be 10 times, 100 times, or higher.

FIG. 7B illustrates a result of calculating the depth map at the processors 320, 420, 520, in which the main subject 721 is at a closest position to the photographers 310, 410, 510, and the point light sources 722, 723 in the background are at a farther position than the main subject 721.

Hereinbelow, further details of the processor 420 generating a post-processed image of the second image using the brightness map will be described with reference to FIGS. 8 to 11. FIG. 8 is a diagram illustrating an example operation of the image photographing apparatus generating a post-process image of the second image using a brightness map and a depth map.

In FIG. 8, the processor 800 is represented as a block unit of a certain function of the processor 420 that is used for the purpose of generating a brightness map, and may include a Bokeh kernel map generator 820, a per-depth image coordinate set generator 830, a convolution operator 840, and a second compositor 850.

The brightness map 801 may be generated with a method as illustrated in FIG. 5, for example, and it may be two dimensional data that includes brightness information about respective coordinate values of the second image.

As described above with reference to FIGS. 2 and 3, the depth map 802 may be generated with a variety of methods, and may be the two dimensional data that includes depth information about the respective coordinate values of the second image.

The second image 803 is a high definition general image acquired through the camera 410 based on the second shutter timing. For example, when the image photographing apparatus 400 is a mobile phone, most of the subjects may be in-focus as the image is photographed with a short focal distance lens such as phone camera. However, example embodiments are not limited herein. Accordingly, even when the image photographing apparatus 400 is a CSC or DSLR camera, if a short focal distance lens is employed, then the image acquired through the corresponding device may also be the second image 803. The second image 803 with most subjects being in-focus will be modified into out-focus image by the post-processing as described below.

The lens parameter 810 may include one or more of F-number, focal distance, and aperture shape as a lens condition necessary for the processor 420 to generate out-focus effect with post-processing. In this example, the lens parameter 810 may be preset default value, or value set by a user through a menu to adjust lens parameter.

The per-depth image coordinate set generator 830 determines steps of depth to perform out-focusing with respect to the second image 803 by using the depth map 802. For example, the per-depth image coordinate set generator 830 divides the second image 803 into per-depth coordinates based on the image coordinates extracted from the depth map 802, and thus divides the second image 803 into a plurality of image regions having same depths.

FIG. 8 illustrates (n) number of image coordinate sets having different depth values from one another, divided from the second image by the per-depth image coordinate set generator 830. The depth-1 image region 830-1 represents an image coordinate set having the farthest depth, depth-2 image region 830-2 represents an image coordinate set having the second farthest depth, and depth-n image region 830-n represents an image coordinate set corresponding to the closest subject. As described above, by dividing the second image into per-depth image coordinate sets, operation can be performed fast, and images can be composited into more naturally-appearing out-focus composite image.

A user may be able to select a desired position of focal detection in the second image through the focal region select UI. The focal region 831 in FIG. 8 represents information about a focal region selected by the user in the second image. Accordingly, the per-depth image coordinate set generator 830 may generate per-depth image coordinate sets based on the focal region selected by the user as a reference point of the depth, and the Bokeh in this region may be reduced and/or minimized.

The Bokeh kernel map generator 820 may put together the information on the brightness map 801, the depth map 802, the lens parameter 810 and the per-depth image coordinate sets generated by the per-depth image coordinate set generator 830, and generate information on the per-depth Bokeh in the second image.

For example, the Bokeh kernel map generator 820 may determine an out-focus kernel, i.e., shape and size of the per-depth Bokeh suitable for each step of the depth, by referring to the depth information of the second image acquired from the information 830 on the depth map 802 and the per-depth image coordinate sets, and the lens parameter 810.

For example, the Bokeh kernel map generator 820 may calculate the size of the per-depth Bokeh with the mathematical expression such as Equation 1 described above. Equation 1 will be described in greater detail below with reference to FIG. 9.

Figure 9:
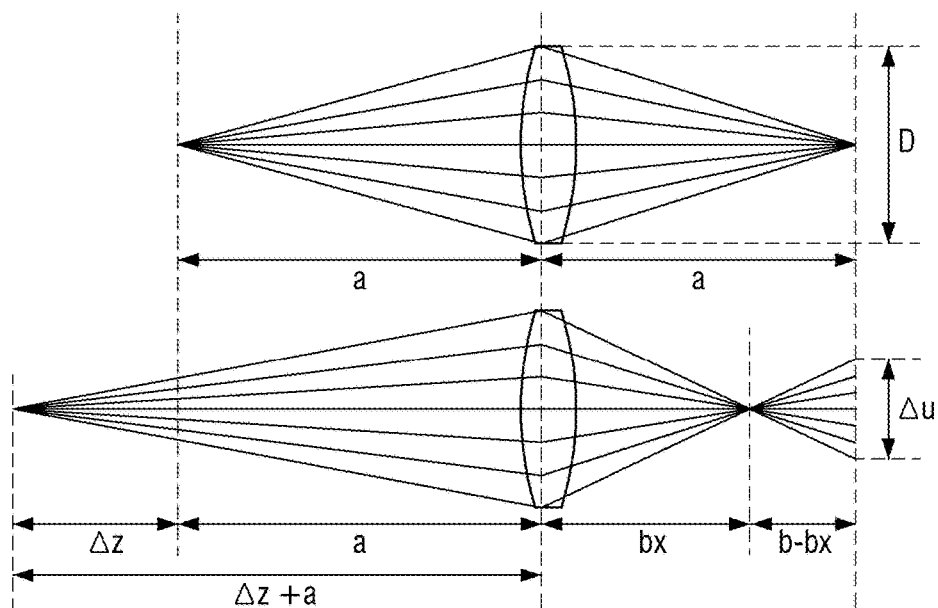
FIG. 9 is a diagram illustrating an example mathematical equation to determine a size of Bokeh per depth.

FIG. 9 is a diagram illustrating various parameters used to describe an example mathematical expression to determine the size of per-depth Bokeh. For example, FIG. 9 illustrates an example in which, when a main subject at a distance a from the lens is focused, the size of the Bokeh (i.e., defocused spot) based on distance difference (depth, Δz) between the main subject and an object in the background is expressed as Δu.

According to the diagrammatic presentation of FIG. 9, the relationship between Δz and Δu may be expressed as Equation 2 below.

$$\Delta z = \frac{a}{1 - \frac{\Delta u}{D}\left(\frac{f - a}{f}\right)} - a \qquad \text{[Equation 2]}$$

where, 'f' denotes focal distance of a lens, 'D' is a diameter, 'a' is a distance from the lens to the main subject that is focused, 'Δz' is a distance between the main subject and the object in the background, and 'Δu' is a size of the Bokeh.

By rearranging Equation 2 with respect to F-number (=f/D) of the lens, Equation 2 may be approximated to Equation 1 described above. Accordingly, the Bokeh kernel map generator 820 may determine the size of the per-depth Bokeh by applying the depth information of the second image and the lens parameter to Equation 1.

The Bokeh kernel map generator 820 may determine the Bokeh shape by referring to the lens parameter, or more specifically, the information on aperture shape. The aperture shape may refer to actual physical aperture shape, but not limited thereto. Accordingly, a certain shape selected by the user through the menu to adjust lens parameter may also be the aperture shape.

For example, when a distance difference Δz occurs between the subject and a reference distance 'a', the Bokeh kernel map generator 820 may determine the size of the Bokeh kernel by calculating how large of a Bokeh is generated on the photographing element based on the lens parameter, e.g., F/# and the focal distance difference, and may provide the Bokeh shape information corresponding to circle or polygon according to the aperture shape.

Further, the Bokeh kernel map generator 820 may generate information on per-depth Bokeh magnitude by referring to the brightness map 801. Since the brightness map 801 includes information on the per-coordinate brightness of the second image, the Bokeh kernel map generator 820 may generate a magnitude difference of the Bokeh having the same shape and size. Accordingly, actually weak light source is dissipated, and the strong light source maintain relatively high brightness even after the Bokeh is generated.

Referring to FIG. 8, Bokeh kernel-1 820-1 to Bokeh kernel-n 820-n represent (n) number of Bokeh kernels to be differently applied based on depths, in which each of the Bokeh kernels includes shape, size, and magnitude information about the Bokeh to be applied to corresponding per-depth image coordinate sets.

The convolution operator 840 performs a convolution operation of each image coordinate set based on depth differences. For example, as illustrated in FIG. 8, the convolution operator 840 may perform convolution operation for the image coordinate regions divided based on depths, and the Bokeh kernel corresponding to the same, and thus generate per-depth out-focused image regions.

The second compositor 850 combines image segments that underwent the convolution operation at the convolution operator 840. In this example, Conv. 1 (840-1) is the image coordinate set having the farthest depth, Conv. 2 (840-2) is the image coordinate set having the second farthest depth, and Conv. n (840-n) is the image coordinate set corresponding to the closest subject.

Meanwhile, according to an example embodiment, the second compositor 840 may combine the results of convolution operation according to a preset sequence or a sequence determined by the user. For example, the compositing sequence 851 represents information on the preset sequence, or the combining sequence as set by the user through a combine sequence set UI.

It is possible to generate more naturally-appearing Bokeh image by adjusting the sequence of combining the per-depth segment images. Generally, the second compositor 840 may combine the images in the order beginning from Conv. 1 (840-1), i.e., the image segment of the farthest coordinate set, to Conv. n (840-n), i.e., the closest image segment, although exemplary embodiments are not limited thereto.

Through the process described above, the second image 803 is post-processed and thus becomes an image with out-focus effect, e.g., Bokeh image. For example, the processor 800 may be configured to generate a post-processed image 860 of the second image through the process described above.

FIGS. 10A-10C and 11A-11B illustrate example second images post-processed by the processor 420.

Figure 10A:
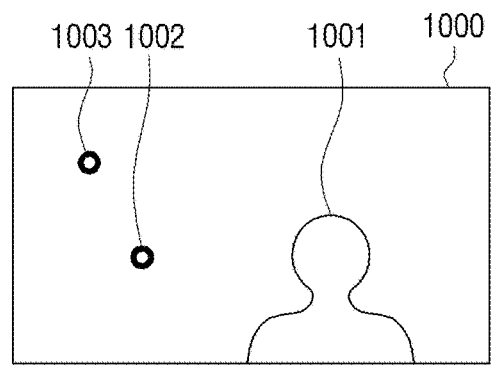
FIGS. 10A-10C and 11A-11B are diagrams illustrating example post-processed second images.
Figure 10B:
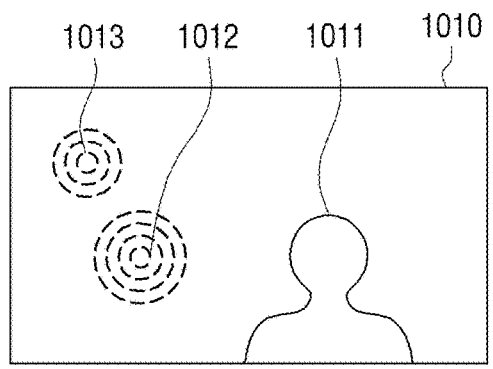
Figure 10C:
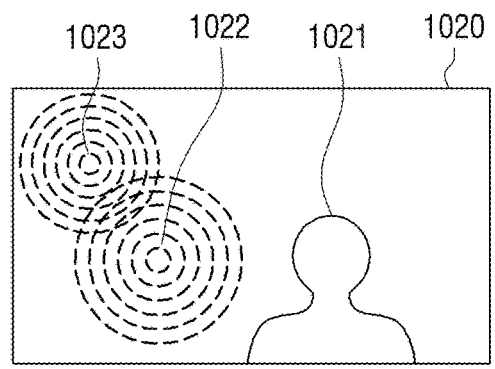

FIGS. 10A-10C illustrate an example post-processed image of an original image with the short focal distance, obtained by applying a photographing effect of a telephoto lens as an out-focus effect. For example, FIG. 10A illustrates a second image before post-processing, e.g., the original image photographed with a short focal distance phone camera, FIG. 10B illustrates a post-processed image obtained after DSLR telephoto lens F/2.8 effect is applied, and FIG. 10C illustrates a post-processed image obtained after DSLR telephoto lens F/1.4 effect is applied. Further, FIGS. 10A-10B illustrate an example in which a reference numeral 1001 is selected the focal region (e.g., position at which focal point is detected).

As illustrated in FIGS. 10B and 10C, irrespective of F/#, the main subject 1011, 1021 is still expressed in-focus even after the post-processing, while the point light sources 1012, 1013, 1022, 1023 with distance differences from the main subject 1011, 1021 are post-processed to be expressed in different sizes according to F/#.

Figures 11A, 11B:
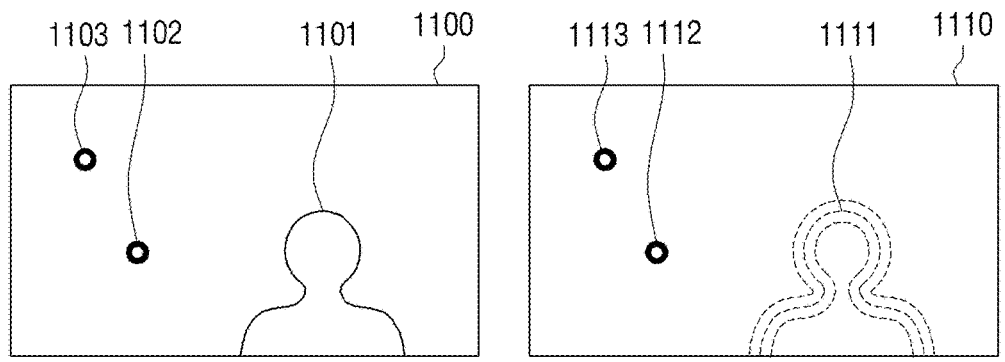

Meanwhile, as described above, the focal region may be selected by the user. FIGS. 11A and 11B illustrate an example in which the point light sources in the background are selected as the focal regions by the user. For example, FIG. 11A illustrates the second image photographed with a phone camera having a short focal distance lens as in the case of FIG. 10A, and FIG. 11B illustrates a post-processed image obtained after the DSLR telephoto lens effect is applied.

As illustrated in FIG. 11A, in the second image photographed with the short focal distance phone camera, even when the focal regions are changed to the point light sources 1102, 1103 in the background, the resultant acquired image has the entire subjects in focus similarly to the example illustrated in FIG. 10A. Post-processing such second image with the point light sources 1102, 1103 being applied as the focal regions according to example embodiments renders an image in which the main subject 1111 is modified and expressed as a Bokeh image, while the point light sources 1112, 1113 are in focus, as illustrated in FIG. 11B.

Figure 12:
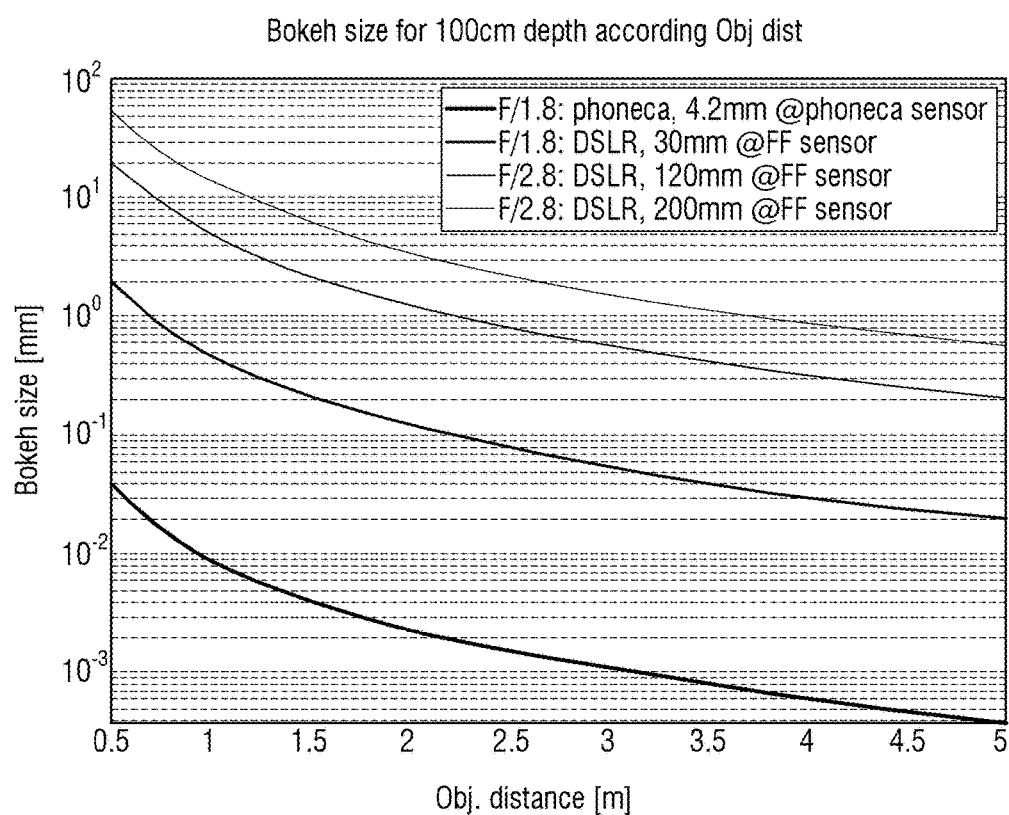
FIG. 12 is a diagram illustrating an example result of determining a Bokeh size based on changes in the distance of a main subject.

FIG. 12 is a diagram illustrating an example result of calculation of Bokeh size according to a change in the main subject distance. For example, FIG. 12 illustrates an example in which the Bokeh size Δu per lens condition (e.g., F/#, focal distance) according to a change in the main subject distance 'a' is calculated by Equation 1, when depth difference Δz is 100 cm.

As indicated in the legend of FIG. 12, FIG. 12 diagrams a comparison between Bokeh sizes respectively formed on an image sensor of a phone camera with lens focal distance 4.2 mm, and on a full frame (FF) image sensor mounted to a high-end DSLR camera.

As illustrated in FIG. 12, with a short lens focal distance, the Bokeh size by the depth difference is very small. Further, the Bokeh size rapidly increases with increasing lens focal distance.

Figure 13A:
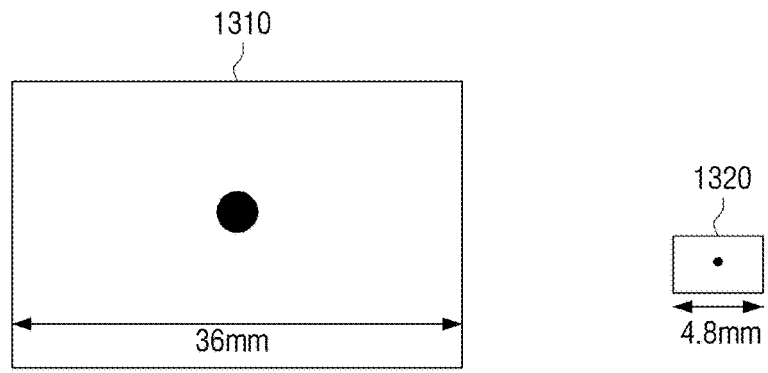
FIGS. 13A-13B are diagrams illustrating an example of converting a determined Bokeh size based on an image sensor size.
Figure 13B:
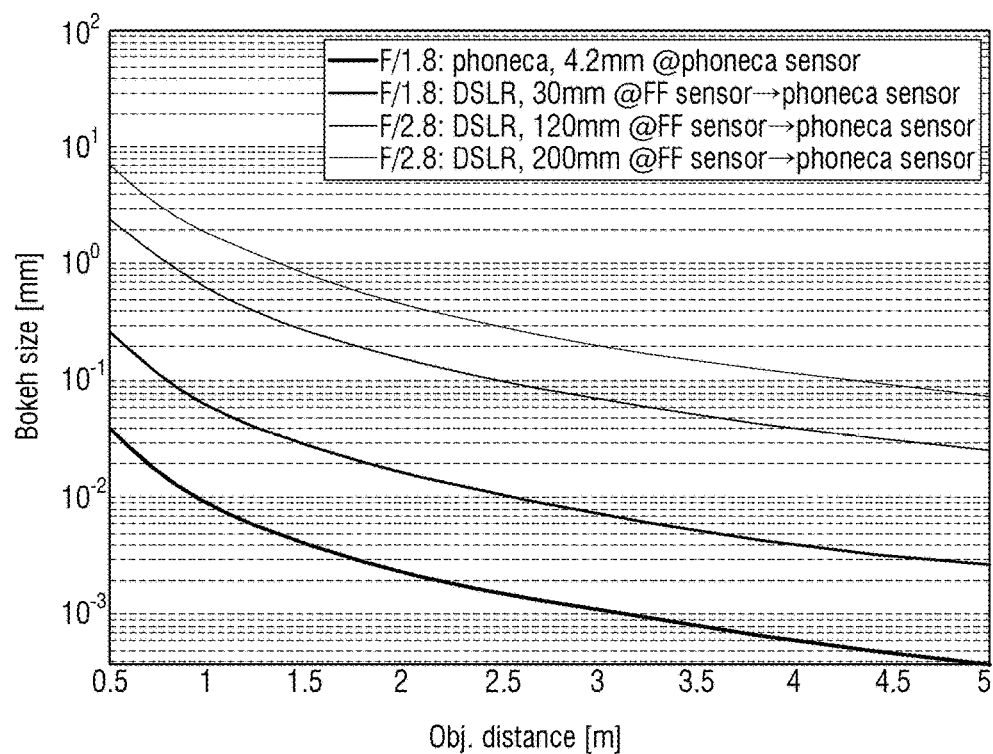

FIGS. 13A and 13B are diagrams illustrating an example of converting calculated Bokeh size according to the size of an image sensor.

FIG. 13A compares a full frame DSLR image sensor 1310 with ⅓" phone camera image sensor 1320. As illustrated in FIG. 13A, the size 1310 of the full frame image sensor is about 7.5 times larger than the ⅓" phone camera image sensor 1320.

In order to obtain an image having approximately 70 degrees of field of view with a full frame DSLR image sensor, it is necessary to use 30 mm DSLR lens, while in order to acquire approximately 70 degrees of field of view with the ⅓" phone camera image sensor, it is necessary to attach 4.2 mm focal distance lens. For example, because the DSLR camera combining the full frame image sensor and the 30 mm focal distance lens, and the phone camera using the ⅓" image sensor and 4.2 mm focal distance lens have the same point of view (e.g., approximately 70 degrees), from the perspective of the field of view, the converted focal distance of the phone camera using ⅓" image sensor and the 4.2 mm focal distance lens may be expressed as 30 mm.

As described above, because a certain conversion ratio applies between the full frame DSLR image sensor and ⅓" phone camera image sensor, it is necessary to adjust the Bokeh size calculated under full frame DSLR condition to a size suitable for the size of the ⅓" image sensor.

FIG. 13B illustrates a result of re-adjusting FIG. 12 with the conversion ratio of the phone camera image sensor. For example, FIG. 13B is a result of multiplying the Bokeh size calculated under DSLR condition by 1/7.56 (13.2%) as a conversion ratio. Meanwhile, in the graph illustrated in FIG. 13B, "phoneca, 4.2 mm @phoneca sensor" refers to a phone camera which does not need to apply conversion ratio. Accordingly, it illustrates the same result as in "phoneca, 4.2 mm @phoneca sensor" in FIG. 12.

As described above, the processor 420 may be configured to convert the calculated Bokeh size per depth, according to the size of the image sensor included in the photographer 410.

According to an example embodiment, the processor 420 may be configured to control the display 440 to display a menu to adjust lens parameter. In this example, the menu to adjust lens parameter refers to a menu that allows the user to set the lens parameter such as focal distance, F-number, aperture shape, and so on, to be applied during image photographing, and may include at least one UI element corresponding to at least one lens parameter.

When the user changes a lens parameter, the processor 420 may be configured to perform post-processing of the second image based on the lens parameter changed by the user.

Meanwhile, according to another example embodiment, the processor 420 may be configured to control the display 440 to also display the lens adjusting parameter when the post-processed image of the second image is being displayed.

Accordingly, when a user instruction is input to at least one UI element displayed, the processor 420 may be configured to post-process the second image again based on the lens parameter corresponding to the UI element that received the user instruction, and control the display 440 to display the re-post-processed second image.

Figure 14:
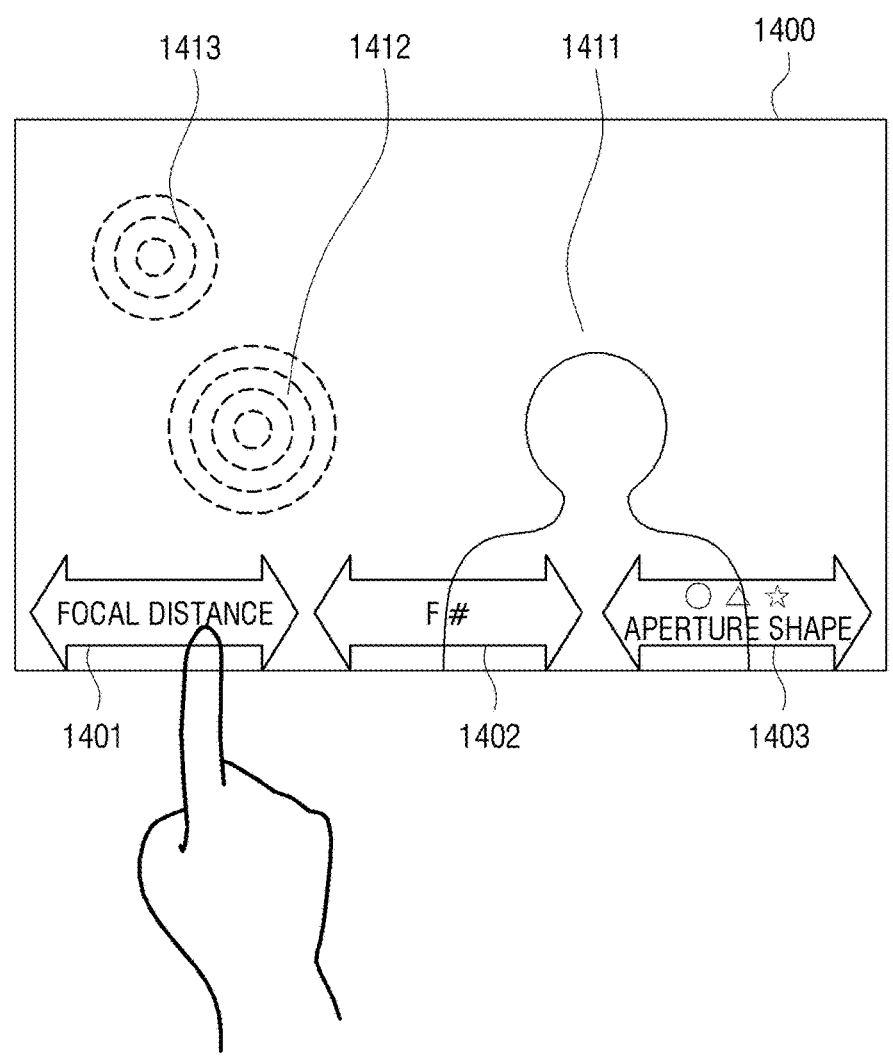
FIG. 14 is a diagram illustrating an example lens parameter adjustment menu displayed while a post-processed image of a second image is being displayed.

FIG. 14 is a diagram illustrating an example menu to adjust lens parameter being displayed while the post-processed image of the second image is displayed.

As illustrated in FIG. 14, the second image, post-processed based on a preset lens parameter, may be displayed on the touch screen 1400, along with the menu to adjust lens parameter. In this example, the menu to adjust lens parameter may include UI elements 1401, 1402, 1403 each corresponding, for example, to the focal distance, F/#, and aperture shape of the lens.

Accordingly, when the user changes the lens parameter, the Bokeh or blur size of the background subjects 1412, 1413 having depth distances from the main subject 1411 is calculated real time and reflected on the touch screen.

For example, when the lens parameter is changed, the processor 420 may again calculate Bokeh kernel map based on the changed lens parameter, and re-post-process the second image based on the re-calculated Bokeh kernel map. Accordingly, the processor 420 may be configured to control the display 440 to display the re-post-processed second image.

Meanwhile, it will be appreciated that the shape of the menu to adjust lens parameter, or the position where it is displayed are not specifically limited to the examples illustrated in FIG. 14.

FIG. 15 is a flowchart illustrating an example method of controlling or operating an image photographing apparatus 300, 400. According to FIG. 15, the image photographing apparatus 300, 400 may acquire at least one first image based on a first shutter timing, at S1510, and acquire a second image based on a second shutter timing, at S1520.

In this example, depending on example embodiments, the image photographing apparatus 300, 400 may first acquire the second image, and then acquire at least one first image.

Meanwhile, at S1530, the image photographing apparatus 300, 400 may generate a brightness map of the second image, using the at least one first image.

For example, while compositing the at least one first images, the image photographing apparatus 300, 400 may detect saturation states of the coordinates values of the composited image, acquire brightness information of the coordinate values based on the number of composited first images where the coordinate values have the saturation states, and generate a brightness map based on the acquired brightness information of the coordinate values.

The image photographing apparatus 300, 400 may adjust the resolution of the at least one first image and composite at least one resolution-adjusted first image.

Further, the image photographing apparatus 300, 400 may stop compositing the at least one first images, when the brightness of the coordinate values of the composited image corresponding to the main subject included in the second image reaches a preset value.

As described above, at S1540, with the brightness map generated, the image photographing apparatus 300, 400 may generate a post-processed image of the second image using the generated brightness map.

For example, the image photographing apparatus 300, 400 may generate a depth map of the second image, generate information on per-depth image coordinate sets of the second image, and per-depth Bokeh corresponding to the per-depth image coordinate sets, using the depth map and the brightness map, and post-process the second image by applying corresponding per-depth Bokeh to the per-depth image coordinate sets, respectively.

The image photographing apparatus 300, 400 may divide the second image into coordinates of same depth based on the depth map, generate information on the per-depth image coordinate sets of the second image, generate per-depth Bokeh size information and shape information based on the lens parameter set for the image photographing apparatus, the depth map, and the information on the per-depth image coordinate sets, and generate magnitude of the per-depth Bokeh based on the brightness map.

Further, the image photographing apparatus 300, 400 may calculate per-depth Bokeh size using a mathematical expression such as, for example, that shown in Equation 1.

Further, according to an example embodiment, the image photographing apparatus 300, 400 may convert the calculated per-depth Bokeh size based on a size of an image sensor included in the image photographing apparatus.

Further, the image photographing apparatus 300, 400 may perform convolution operation for per-depth Bokeh for each of the per-depth image coordinate sets, and perform post-processing of the second image by combining the results of the convolution operations of each depth.

According to an example embodiment, while the post-processed second image is displayed, the image photographing apparatus 300, 400 may display a menu to adjust lens parameter including at least one UI element corresponding to at least one lens parameter, and when an instruction is input to at least one UI element, may re-post-process the second image based on the lens parameter corresponding to the UI element where the instruction is input, and display the re-post-processed second image.

According to various example embodiments described above, more naturally appearing Bokeh image can be provided, when out-focus effect is obtained by post-processing an image photographed through the image photographing apparatus. As a result, even when an image is photographed through an image photographing apparatus equipped with a short focal distance lens, the user can have an experience of using a high-end DSLR camera equipped with telephoto lens.

For example, it is possible to generate out-focus effect that is not like that provided by a general out-focus post-processing and generate a naturally-appearing Bokeh image in which point light sources are retained, by referring to the absolute quantity of light and distance in the image coordinates based on the brightness map.

As a result, it is possible to achieve an image photographing effect that is provided by a large format camera, with a small format camera.

Meanwhile, the operations of the processors 220, 320, 520, 800 of the image photographing apparatus and controlling methods of the image photographing apparatus according to various example embodiments described above may be generated as software and mounted to the image photographing apparatus.

For example, a non-transitory computer readable medium storing programs for performing a method of controlling an image photographing apparatus may be installed, in which the method may include acquiring a plurality of first images based on a first shutter timing and acquiring a second image based on a second shutter timing; generating a brightness map off the second image by using the acquired first images; and generating a post-processed image of the second image based on the generated brightness map.

The 'non-transitory computer readable medium' as used herein refers to a medium which stores data semi-permanently and can be read by devices. For example, the above various middleware or programs may be stored and provided in non-transitory computer readable recording medium such as CD, DVD, hard disk, Blu-ray disk, USB, memory card, or ROM.

The foregoing example embodiments and advantages are merely examples and are not to be construed as limiting. The disclosure can be readily applied to other types of apparatuses. Also, the description of the example embodiments is intended to be illustrative, and not to limit the scope of the claims, and many alternatives, modifications, and variations will be apparent to those skilled in the art. Accordingly, it should be considered that all such proper alternatives, modifications and equivalents fall within the scope of the present disclosure.

What is claimed is:

1. An image photographing apparatus, comprising:
   a camera; and
   a processor configured to:
      control the camera to acquire a plurality of first images based on a first shutter timing and to acquire a second image based on a second shutter timing;
      composite the plurality of first images one by one for accumulating brightness information included in each of the plurality of first images;
      obtain a brightness map based on the accumulated brightness information; and
      obtain a post-processed image of the second image using the obtained brightness map.

2. The image photographing apparatus of claim 1, wherein the processor is configured to identify a saturation state of coordinate values of a composite image while the plurality of first images is being composited, obtain brightness information of the coordinate values based on a number of the first images in which the coordinate values include a saturation state, and obtain the brightness map based on the acquired brightness information of the coordinate values.

3. The image photographing apparatus of claim 2, wherein the processor is configured to stop compositing the plurality of first images when a brightness of the coordinate values of a composite image corresponding to a main subject included in the second image reaches a preset value.

4. The image photographing apparatus of claim 2, wherein the processor is configured to adjust a resolution of the plurality of first images, and composite the resolution-adjusted first images.

5. The image photographing apparatus of claim 1, wherein the processor is configured to obtain a depth map of the second image; obtain information on per-depth image coordinate sets of the second image, and information on per-depth Bokeh corresponding to the per-depth image coordinate sets; and post-process the second image by applying the corresponding per-depth Bokeh to each of the per-depth image coordinate sets respectively.

6. The image photographing apparatus of claim 5, wherein the processor is configured to obtain information on per-depth image coordinate sets of the second image by dividing the second image into coordinates comprising a same depth based on the depth map; obtain size information and shape information of the per-depth Bokeh based on information on a lens parameter set for the image photographing apparatus, the depth map and the per-depth image coordinate sets; and obtain magnitude information of the per-depth Bokeh based on the brightness map.

7. The image photographing apparatus of claim 5, wherein the processor is configured to identify a size of the per-depth Bokeh satisfying the equation:

$$\Delta u = \left(\frac{1}{F\#}\right)\left(\frac{f}{a}\right)^2 \Delta z$$

where, '$\Delta u$' denotes a Bokeh size, '$F\#$' is F-number of a lens set for the image photographing apparatus, '$f$' is a focal distance of the lens set for the photographing apparatus, '$a$' is a distance between main subject of the second image and the lens, and '$\Delta z$' is a distance between the main subject of the second image and the object in the background.

8. The image photographing apparatus of claim 7, wherein the processor is configured to convert the identified size of the per-depth Bokeh based on a size of an image sensor included in the camera.

9. The image photographing apparatus of claim 5, wherein the processor is configured to perform a convolution operation of the corresponding per-depth Bokeh for each of the per-depth image coordinate sets, combine results of the convolution operations per depth, and perform post-processing of the second image.

10. The image photographing apparatus of claim 1, further comprising:
    an input; and
    a display,
    wherein the processor is further configured to:
       while the post-processed image of the second image is displayed, control the display to display a menu to adjust lens parameter including at least one user interface (UI) element corresponding to at least one lens parameter; and
       based on receiving an instruction input to the at least one UI element through the input, re-post-process the second image based on a lens parameter corresponding to the UI element through which the instruction is input, and to control the display to display the re-post-processed second image.

11. A method of controlling an image photographing apparatus, comprising:
    acquiring a plurality of first still images based on a first shutter timing and acquiring a second still image based on a second shutter timing;
    compositing the plurality of first images one by one for accumulating brightness information included in each of the plurality of first images;
    obtaining a brightness map based on the accumulated brightness information; and
    obtaining a post-processed image of the second image using the obtained brightness map.

12. The method of claim 11, wherein obtaining the brightness map comprises:
    identifying a saturation state of coordinate values of a composite image while the plurality of first images is being composited;
    obtaining brightness information of the coordinate values based on a number of the first images in which the coordinate values include saturation state; and
    obtaining the brightness map based on the acquired brightness information of the coordinate values.

13. The method of claim 12, wherein compositing the plurality of first images comprises stopping compositing the plurality of first images when a brightness of the coordinate values of a composite image corresponding to a main subject included in the second image reaches a preset value.

14. The method of claim 12, wherein compositing the plurality of first images comprises:

adjusting a resolution of the plurality of first images; and
compositing the resolution-adjusted first images.

15. The method of claim 11, further comprising obtaining a depth map of the second image, wherein
obtaining the post-processed image comprises:
obtaining information on per-depth image coordinate sets of the second image, and information on per-depth Bokeh corresponding to the per-depth image coordinate sets; and
performing post-processing of the second image by applying the corresponding per-depth Bokeh to each of the per-depth image coordinate sets respectively.

16. The method of claim 15, wherein generating the information comprises:
obtaining information on per-depth image coordinate sets of the second image by dividing the second image into coordinates comprising a same depth based on the depth map; and
obtaining size information and shape information of the per-depth Bokeh based on information of a lens parameter set for the image photographing apparatus, the depth map and the per-depth image coordinate sets, and obtaining magnitude information of the per-depth Bokeh based on the brightness map.

17. The method of claim 15, wherein obtaining the information comprises identifying a size of the per-depth Bokeh satisfying the equation:

$$\Delta u = \left(\frac{1}{F\#}\right)\left(\frac{f}{a}\right)^2 \Delta z$$

where, '$\Delta u$' denotes a Bokeh size, 'F#' is F-number of a lens set for the image photographing apparatus, 'f' is a focal distance of the lens set for the photographing apparatus, 'a' is a distance between main subject of the second image and the lens, and '$\Delta z$' is a distance between the main subject of the second image and the object in background.

18. The method of claim 17, wherein obtaining the information comprises converting the identified size of the per-depth Bokeh based on a size of an image sensor included in the photographing apparatus.

19. The method of claim 15, wherein performing the post-processing comprises:
performing a convolution operation of the corresponding per-depth Bokeh for each of the per-depth image coordinate sets; and
combining results of the convolution operations per depth.

20. The method of claim 11, further comprising:
displaying a menu to adjust lens parameter while displaying the post-processed image of the second image, the menu including at least one user interface (UI) element corresponding to at least one lens parameter;
based on receiving an instruction input to the at least one UI element, re-post-processing the second image based on a lens parameter corresponding to the UI element through which the instruction is input; and
displaying the re-post-processed second image.

* * * * *